US005082890A

United States Patent [19]

Chou et al.

[11] Patent Number: 5,082,890

[45] Date of Patent: Jan. 21, 1992

[54] FILLED THERMOPLASTIC MOLDING COMPOSITIONS

[75] Inventors: Chai-Jing Chou, Missouri City, Tex.; Gregory M. Smith, Danbury, Conn.; Hani Farah, Sugarland, Tex.

[73] Assignee: The Dow Chemical Company, Midland, Mich.

[21] Appl. No.: 570,483

[22] Filed: Aug. 21, 1990

[51] Int. Cl.$^5$ .................... C08K 3/34

[52] U.S. Cl. .................... 524/451; 525/67; 525/902

[58] Field of Search .................... 525/902, 67; 524/451

[56] References Cited

U.S. PATENT DOCUMENTS

| | | | |
|---|---|---|---|
| 3,424,783 | 1/1969 | Jones | 524/451 |
| 3,859,246 | 1/1975 | Jackson et al. | 524/451 |
| 3,919,164 | 11/1975 | Hattori et al. | 524/451 |
| 4,267,096 | 5/1981 | Bussiak et al. | 525/439 |
| 4,464,487 | 8/1984 | Thomas et al. | 524/413 |
| 4,536,542 | 8/1985 | Allen | 525/439 |
| 4,654,400 | 3/1987 | Lohmeijer et al. | 525/902 |
| 4,857,605 | 8/1989 | Lutz | 525/445 |
| 4,859,738 | 8/1989 | Farah et al. | 525/67 |
| 4,894,423 | 1/1990 | Farah et al. | 525/439 |
| 4,929,672 | 5/1990 | Laughner | 525/439 |
| 4,966,942 | 10/1990 | Susaki et al. | 525/902 |

*Primary Examiner*—Veronica P. Hoke
*Attorney, Agent, or Firm*—John A. Langworthy

[57] ABSTRACT

Filled thermoplastic molding composition containing a polycarbonate, a polyester, an olefin/carbon monoxide copolymer, a grafted core-shell elastomer, and a talc filler.

15 Claims, No Drawings

FILLED THERMOPLASTIC MOLDING COMPOSITIONS

FIELD OF THE INVENTION

This invention relates to compositions wherein polycarbonate has been blended with a combination of substances for the purpose of improving the solvent resistance, impact strength and dimensional stability of such compositions, and methods for improving the solvent resistance, impact strength and dimensional stability of polycarbonate compositions.

BACKGROUND OF THE INVENTION

Polycarbonate has found many uses as an engineering thermoplastic because it combines, in general, a high level of heat resistance, impact resistance and dimensional stability with good insulating and non-corrosive properties, and it is easily molded. It does, however, suffer from a tendency to craze and crack under the effects of contact with organic solvents such as gasoline, especially when under a stress such as a flexural or torsional stress. Polycarbonate which has crazed is, undesirably, more likely to experience brittle rather than ductile failure from impact. This disadvantage has been somewhat relieved by the practice of blending polycarbonate with various olefin polymers such as polyethylene, polypropylene or polyisobutylene, as described for example in Goldblum, U.S. Pat. No. 3,431,224. These added substances are capable of improving the resistance of polycarbonate to solvents somewhat, but they tend to cause an offsetting increase in the delamination of the blended composition, as reported for example in Bussink, U.S. Pat. No. 4,122,131.

In U.S. Pat. No. 4,859,738, a solvent-resistant blend of polycarbonate, polyester and ethylene/carbon monoxide copolymer is disclosed. Also disclosed therein are several elastomeric impact modifiers which can be admixed with such a blend to improve its impact strength, and several additives for admixture therewith, including fillers. We have found that certain fillers when added to such a blend are preferred to others because they improve dimensional stability while preserving higher levels of the solvent resistance and impact strength which are imparted to polycarbonate by the polyester, ethylene/carbon monoxide and impact modifier.

SUMMARY OF THE INVENTION

In one aspect, this invention involves a composition of matter containing (a) a polycarbonate, (b) a polyester, (c) an olefin/carbon monoxide copolymer, (d) a grafted core-shell elastomer, and (e) a filler such as talc. In another aspect, this invention involves a method of improving the solvent resistance, impact resistance and dimensional stability of a composition of matter containing (a) a polycarbonate, (b) a polyester, (c) an olefin/carbon monoxide copolymer, and (d) a grafted core-shell elastomer by blending with such composition (e) a filler such as talc.

It has been found that compositions in which polycarbonate has been admixed in a blended composition with a polyester, an ethylene/carbon monoxide copolymer, a grafted core-shell elastomer and a filler such as talc display high levels of dimensional stability while maintaining high levels of both solvent resistance and impact strength.

The compositions of this invention are useful, for example, in the production of films, fibers, extruded sheets, multi-layer laminates and molded or shaped articles of virtually all varieties, especially appliance and instrument housings, automobile body panels and other components for use in the automotive and electronics industries.

DETAILED DESCRIPTION OF THE INVENTION

The compositions of this invention are those in which (a) polycarbonate has been admixed in a blended composition with (b) a polyester, (c) an olefin/carbon monoxide copolymer, (d) a grafted core-shell elastomer, and (e) a filler such as talc. Suitable ranges of content for the compositions of this invention, in parts by weight with reference to the total composition, are as follows: (a) polycarbonate from about 10 to about 93 parts, (b) polyester from about 5 to about 90 parts, (c) olefin/carbon monoxide copolymer from about 1 to about 15 parts, (d) grafted core-shell elastomer from about 1 to about 15 parts, and (e) filler from about 1 to about 40 parts. Preferred ranges of content for the compositions of this invention, in parts by weight with reference the total composition, are as follows: (a) polycarbonate from about 38 to about 87 parts, (b) polyester from about 10 to about 60 parts, (c) olefin/carbon monoxide copolymer from about 1 to about 10 parts, (d) grafted core-shell elastomer from about 1 to about 10 parts, and (e) filler from about 1 to about 30 parts.

Preparation of the compositions of this invention can be accomplished by any suitable means known in the art. Typically the substances to be admixed with polycarbonate are dry blended in particulate form with sufficient agitation to obtain thorough distribution thereof. If desired, the dry-blended formulation can further, but need not, be melt mixed, for example in an extruder. Alternatively, a master batch formulation can be prepared containing polycarbonate and the substances to be admixed or blended with it wherein polycarbonate is present in only a minor proportion, e.g. 20%. The master batch is then available for storage or shipment in commerce, and can be diluted with additional polycarbonate at the time of use The compositions of this invention can be formed or molded using conventional techniques such as compression, injection, calendering, vacuum forming, extrusion and/or blow molding techniques, alone or in combination. The compositions can also be formed into films, fibers, multilayer laminates, extruded sheets or molded articles on any machine suitable for such purpose.

(a) Polycarbonate. The aromatic polycarbonates suitable for use in this invention are produced by any of several conventional processes known in the art. Generally, aromatic polycarbonates are prepared by reacting an aromatic dihydric phenol with a carbonate precursor, such as phosgene, a haloformate or a carbonate ester.

A preferred method for preparing an aromatic polycarbonate involves the use of a carbonyl halide, such as phosgene, as the carbonate precursor. Phosgene gas is passed into a reaction mixture containing an activated dihydric phenol, or containing a nonactivated dihydric phenol and an acid acceptor, for example pyridine, dimethyl aniline, quinoline or the like. The acid acceptor may be used undiluted or diluted with inert organic solvents, such as methylene chloride, chlorobenzene or 1,2-dichloroethane. Tertiary amines are advantageous for use as the acid acceptor since they are good solvents as well as acid acceptors during the reaction.

The temperature at which the carbonyl halide reaction proceeds may vary from below 0° C. to about 100° C. The reaction proceeds satisfactorily at temperatures from room temperature to 50° C. Since the reaction is exothermic, the rate of addition of the carbonate precursor may be used to control the temperature of the reaction. The amount of phosgene or other carbonate precursor required will generally depend upon the amount of dihydric phenol present. One mole of phosgene typically reacts with one mole of dihydric phenol to form the polycarbonate and two moles of HCl. The HCl is in turn taken up by the acid acceptor.

When an activated diphenol is used, phosgene is added to an alkaline aqueous suspension of dihydric phenols. Alkali and alkaline earth oxides and hydroxides, such as NaOH, are useful for deprotonating the diphenol. This is preferably done in the presence of inert solvents such as methylene chloride, 1,2-dichloroethane and the like. Quaternary ammonium compounds may be employed to catalyze the reaction.

Another method for preparing an aromatic polycarbonates involves the phosgenation of an agitated suspension of an anhydrous alkali salt of an aryl diol in a nonaqueous medium such as benzene, chlorobenzene or toluene. The reaction is illustrated by the addition of phosgene to a slurry of the sodium salt of, for example, 2,2-bis(4-hydroxyphenyl)propane ("Bisphenol-A") in an inert polymer solvent such as chlorobenzene.

Generally speaking, a haloformate such as the bishaloformate of Bisphenol-A may be used in place of phosgene as the carbonate precursor in any of the methods described above.

When a carbonate ester is used as the carbonate precursor in the polycarbonate-forming reaction, the materials are reacted at temperatures in excess of 100° C., for times varying from 1 to 15 hours. Under such conditions, ester interchange occurs between the carbonate ester and the dihydric phenol used. The ester interchange is advantageously consummated at reduced pressures on the order of from about 10 to about 100 millimeters of mercury, preferably in an inert atmosphere such as nitrogen or argon. Although the polymer-forming reaction may be conducted in the absence of a catalyst, one may, if desired, employ a typical ester exchange catalyst, such as metallic lithium, potassium, calcium or magnesium. The amount of such catalyst, if used, is usually small, ranging from about 0.001% to about 0.1%, based on the weight of the dihydric phenols employed.

In the solution methods of preparation, the aromatic polycarbonate emerges from the reaction in either a true or pseudo solution depending on whether an aqueous base or pyridine is used as an acid acceptor. The copolymer may be precipitated from the solution by adding a polymer nonsolvent, such as heptane or isopropanol. Alternatively, the polymer solution may be heated, typically under reduced pressure, to evaporate the solvent.

The methods and reactants described above for preparing carbonate polymers suitable for use in the practice of this invention are discussed in greater detail in Moyer, U.S. Pat. No. 2,970,131; Schnell, U.S. Pat. No. 3,028,365: Campbell, U.S. Pat. No. 4,384,108; Glass U.S. Pat. No. 4,529,791; and Grigo, U.S. Pat. No. 4,677,162, each being incorporated as a part hereof.

A preferred aromatic polycarbonate is characterized by repeated units corresponding to the general formula:

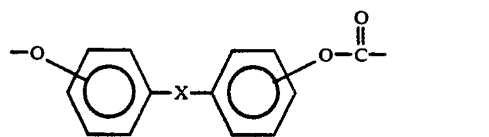

wherein X is a divalent $C_1$-$C_{15}$ hydrocarbon radical, a single bond, —O—, —S—, —$S_2$—, —SO—, —$SO_2$—, or —CO—. Each aromatic ring may additionally contain, instead of hydrogen, up to four substituents such as $C_1$-$C_4$ alkyl hydrocarbon or alkoxy radicals, $C_6$-$C_{14}$ aryl hydrocarbon or aryloxy radicals, or halo radicals, or mixtures thereof.

Although the polycarbonates mentioned above, such as those derived from Bisphenol-A, from 2,2-bis(3,5-dibromo, 4-hydroxyphenyl)propane ("Tetrabromo Bisphenol-A"), or from 1,1-bis(4-hydroxyphenyl)-1-phenyl ethane ("Bisphenol-AP"), can each be employed herein as a homopolymer, the carbonate polymers used in this invention can also be derived from two or more different bisphenols or other aryl dihydroxy compounds to obtain a carbonate copolymer. Carbonate copolymers can also be formed when a bisphenol is reacted with a carbonic acid derivative and a polydiorganosiloxane containing α, ω-bishydroxyaryloxy terminal groups to yield a siloxane/carbonate block copolymer, as are discussed in greater detail in Paul, U.S. Pat. No. 4,569,970, which is incorporated herein. Or, when an aryl dihydroxy compound is reacted with a diacid, or when a bisphenol is reacted with a bis(ar-haloformylaryl) carbonate, a copolymer in the form of a copolyestercarbonate is obtained. A bis(ar-haloformylaryl) carbonate is formed, for example, by reacting a hydroxycarboxylic acid with a carbonic acid derivative under carbonate forming conditions. Copolyestercarbonates are discussed in greater detail in Swart, U.S. Pat. No. 4,105,533, which is incorporated herein.

The term "polycarbonate" as used herein, and in the claims appended hereto, should therefore be understood to include carbonate homopolymers, carbonate copolymers (including, but not limited to, the representative varieties described above), and/or blends of carbonate homopolymers and/or carbonate copolymers.

(b) Polyester. The polyester used in this invention may be made by a variety of methods. Although the self-esterification of hydroxycarboxylic acids is known, direct esterification, which involves the reaction of a diol with a dicarboxylic acid with the resulting elimination of water, is a more frequently used method for commercial production, giving an —[—AABB—] polyester. The presence of a catalyst such as p-toluene sulfonic acid, a titanium alkoxide or a dialkyltin oxide is helpful, but the primary driving force behind direct esterification reaction is heat. Temperatures applied exceed the melting points of the reactants, often approach the boiling point of the diol being used, and usually range from about 150° C. to about 280° C. An excess of the diol is typically used, and once all of the acid has reacted with diol, the excess diol is removed by distillation with the application of additional heat under reduced pressure. The ester of the diacid initially formed from the diol, having —OH end groups, undergoes alcoholysis and polymerization to form polymeric esters and the diol is split out as a byproduct and removed from the reaction zone. The reaction is typically carried out in the presence of an inert gas.

Alternatively, but in like manner, ester-forming derivatives of a dicarboxylic acid can be heated with a diol to obtain polyesters in an ester interchange reaction. Suitable acid derivatives for such purpose are esters, halides, salts or anhydrides of the acid. When a bis ester of the diacid is used for purposes of the interchange reaction, the alcohol from which the ester is formed (the alcohol to be displaced) should be lower boiling than the diol to be used for formation of polyester (the displacing alcohol). The reaction can then be conveniently run at a temperature at or below the boiling point of the displacing alcohol but well above that of the displaced alcohol, and is usually run in a temperature range similar to that for direct esterification. The ester interchange reaction is typically run in the presence of a diluent, for example, an inert organic solvent such as chloroform or tetrachloroethane, and in the presence of a base, for example a tertiary organic base such as pyridine. Typical catalysts used when ester interchange involves alcoholysis are weak bases such as carbonates or alkoxides of sodium, lithium, zinc, calcium, magnesium or aluminum, whereas catalysts such as antimony oxide, titanium butoxide or sodium acetate are often used when acidolysis occurs in the interchange reaction. Diol derivatives such as an acetate can be used effectively when it is desired to conduct acidolysis.

Polyesters can also be produced by a ring-opening reaction of cyclic esters or lactones, for which organic tertiary bases and alkali and alkaline earth metals, hydrides and alkoxides can be used as initiators. Advantages offered by this type of reaction are that it can be run at lower temperatures, frequently under 100° C., and there is no need to remove a condensation product from the reaction.

Suitable reactants for making the polyester used in this invention, in addition to hydroxycarboxylic acids, are diols and dicarboxylic acids either or both of which can be aliphatic or aromatic. A polyester which is a poly(alkylene alkanedicarboxylate), a poly(alkylene phenylenedicarboxylate), a poly(phenylene alkanedicarboxylate), or a poly(phenylene phenylenedicarboxylate) is therefore appropriate for use herein. Alkyl portions of the polymer chain can be substituted with, for example, halogens, alkoxy groups or alkyl side chains and can contain divalent heteroatomic groups (such as —O—, —S— or —$SO_2$—) in the paraffinic segment of the chain. The chain can also contain unsaturation and non-aromatic rings. Aromatic rings can contain substituents such as halogens, alkoxy or alkyl groups, and can be joined to the polymer backbone in any ring position and directly to the alcohol or acid functionality or to intervening atoms.

Typical alkylene diols used in ester formation are the $C_2$–$C_{10}$ glycols, such as ethylene-, propylene-, and butylene glycol. Alkanedicarboxylic acids frequently used are oxalic acid, adipic acid and sebacic acid. Diols which contain rings can be, for example, a 1,4-cyclohexylenyl glycol or a 1,4-cyclohexane-dimethylene glycol, resorcinol, hydroquinone, 4,4'-thiodiphenol, bis-(4-hydroxyphenyl)sulfone, a dihydroxynaphthalene, a xylylene diol, or can be one of the many bisphenols such as 2,2-bis-(4-hydroxyphenyl)propane. Aromatic diacids include, for example, terephthalic acid, isophthalic acid, naphthalenedicarboxylic acid, diphenyletherdicarboxylic acid, diphenyldicarboxylic acid, diphenylsulfonedicarboxylic acid, diphenoxyethanedicarboxylic acid.

In addition to polyesters formed from one diol and one diacid only ("homopolyesters"), the term "polyester" as used herein and in the appended claims includes random, patterned or block copolyesters, for example those formed from two or more different diols and/or two or more different diacids, and/or from other divalent heteroatomic groups. Mixtures of such homopolyesters, mixtures of such copolyesters, and mixtures of members from both of such groups, are also all suitable for use in this invention and are included in the term "polyester". For example, use of cyclohexanedimethylol together with ethylene glycol in esterification with terephthalic acid forms a clear, amorphous copolyester ("PETG") of particular interest. Also contemplated are liquid crystalline polyesters derived from mixtures of 4-hydroxybenzoic acid and 2-hydroxy-6-naphthoic acid: or mixtures of terephthalic acid, 4-hydroxybenzoic acid and ethylene glycol: or mixtures of terephthalic acid, 4-hydroxybenzoic acid and 4,4'-dihydroxybiphenyl.

Aromatic polyesters such as the poly(alkylene phenylenedicarboxylates) polyethylene terephthalate and polybutylene terephthalate, or mixtures thereof, are particularly useful in this invention.

Methods and materials useful for the production of polyesters, as described above, are discussed in greater detail in Whinfield, U.S. Pat. No. 2,465,319, Pengilly, U.S. Pat. No. 3,047,539 and Russell, U.S. Pat. No. 3,756,986, each being incorporated herein by reference.

(c) Olefin Copolymer. An olefin copolymer which contains a carbonyl functionality in its backbone is advantageously utilized in this invention, and the preferred such olefin copolymer is ethylene/carbon monoxide copolymer ("ECO"). ECO is typically formed from ethylene and carbon monoxide in a pressure vessel using a peroxy catalyst, or a metallic catalyst such as palladium. A hydrocarbon liquid which is non-reactive under the polymerization conditions, for example one which acts as a solvent for the catalyst system and in which the catalyst is stable, can be used as a diluent and reaction medium. Air and water are preferably excluded from the reaction chamber. The polymerization can be performed at temperatures in the range from 10° C. up to 200° C., but is preferably run in the range of 50° C. to 140° C. Pressures as high as 3,000 atmospheres (303 MPa) may be employed in the reaction, but the usual pressure of operation is in the range of 20 atmospheres (2.02 MPa) to about 1,500 atmospheres (151.5 MPa). Both yield and molecular weight increase with increasing pressure. Alternatively, an olefin/carbon monoxide copolymer can be made without solvent under high pressure conditions, using a free radical initiator in a stirred autoclave.

A variety of olefin monomers in place of or in addition to ethylene, and numerous unsaturated monomers in addition to the olefin, can be used along with carbon monoxide to form the copolymer backbone. Any unsaturated monomer which will undergo polymerization across a >C═C< bond can form part of the olefin/carbon monoxide ("olefin/CO") copolymer, although the following are preferred: olefin monomers such as propylene, isobutylene, 1-butene or other substituted and unsubstituted $C_3$–$C_8$ alpha alkenes: and unsaturated or vinyl monomers such as butadiene; allyl esters; vinyl acetate; vinyl chloride; vinyl aromatics such as styrene;

alkyl acrylates or methacrylates such as ethyl acrylateor methyl methacrylate; acrylonitrile; tetrafluoroethylene; or the like and mixtures thereof. The structure of the olefin/carbon monoxide copolymer can be random or alternating. The portion of the olefin/CO copolymer used in this invention derived from carbon monoxide is from about 0.1% to about 40%, and preferably from about 0.5% to about 30%, by weight. A copolymer of carbon monoxide and an alpha-mono-olefin, and methods for preparation thereof, are discussed in greater detail in Lancaster, U.S. Pat. No. 4,600,614, Brubaker, U.S. Pat. No. 2,495,286, Loeb, U.S. Pat. No. 3,083,184, Fenton, U.S. Pat. No. 3,530,109and Nozaki, U.S. Pat. No. 3,694,412, each being incorporated herein.

What is set forth above concerning methods of making ECO applies equally to other forms of said olefin/CO copolymer which result from variation in the monomer mix. The olefin/CO copolymer used herein can be made from any of the various monomers, and can be made by any of the various methods, which are included above in the discussion relating specifically to the manufacture of ECO. However, the most preferred olefin/CO copolymer is ECO.

(d) Core-Shell Elastomer. The grafted core-shell elastomer used in this invention can be based on either a diene rubber, an acrylate rubber or on a mixture thereof.

A diene rubber contains a substrate latex, or core, which is made by polymerizing a diene, preferably a conjugated diene, or by copolymerizing a diene with a mono-olefin or polar vinyl compound, such as styrene, acrylonitrile, or an alkyl ester of an unsaturated carboxylic acid such as methyl methacrylate. The substrate latex is typically made up of about 45–75% diene, preferably a conjugated diene, and about 25–55% of the mono-olefin or polar vinyl compound. The elastomeric core phase should have a glass transition temperature ("$T_g$") of less than about 0° C., and preferably less than about −20° C. A mixture of monomers is then graft polymerized to the substrate latex. A variety of monomers may be used for this grafting purpose, of which the following are exemplary: vinyl compounds such as vinyl toluene or vinyl chloride: vinyl aromatics such as styrene, alpha-methyl styrene or halogenated styrene; acrylonitrile, methacrylonitrile or alpha-halogenated acrylonitrile; a $C_1$–$C_8$ alkyl acrylate such as ethyl acrylate or hexyl acrylate; a $C_1$–$C_8$ alkyl methacrylate such as methyl methacrylate or hexyl methacrylate; acrylic or methacrylic acid: and the like or a mixture of two or more thereof.

The grafting monomers may be added to the reaction mixture simultaneously or in sequence, and, when added in sequence, layers, shells or wart-like appendages can be built up around the substrate latex, or core. The monomers can be added in various ratios to each other although, when just two are used, they are frequently utilized in equal amounts. A typical weight ratio for methyl methacrylate/butadiene/styrene copolymer ("MBS" rubber) is about 60–80 parts by weight substrate latex, about 10–20 parts by weight of each of the first and second monomers. A preferred formulation for an MBS rubber is one having a core built up from about 71 parts of butadiene, about 3 parts of styrene, about 4 parts of methyl methacrylate and about 1 part of divinyl benzene; a second phase of about 11 parts of styrene: and a shell phase of about 11 parts of methyl methacrylate and about 0.1 part of 1,3-butylene glycol dimethacrylate, where the parts are by weight of the total composition. A product having substantially such content is available commercially from Rohm and Haas Company as Paraloid TM EXL 3607 copolymer. MBS rubber and methods for making same, as described above, are discussed in greater detail in Saito, U.S. Pat. No. 3,287,443, Curfman, U.S. Pat. No. 3,657,391, and Fromuth, U.S. Pat. No. 4,180,494, each being incorporated herein.

An acrylate rubber has a first phase forming an elastomeric core and a second phase forming a rigid thermoplastic phase about said elastomeric core. The elastomeric core is formed by emulsion or suspension polymerization of monomers which consist of at least about 50 weight percent alkyl and/or aralkyl acrylates having up to fifteen carbon atoms, and, although longer chains may be used, the alkyls are preferably $C_2$–$C_6$, most preferably butyl acrylate. The elastomeric core phase should have a $T_g$ of less than about 25° C., and preferably less than about 0° C.

The rigid thermoplastic phase of the acrylate rubber is formed on the surface of the elastomeric core using suspension or emulsion polymerization techniques. The monomers necessary to create this phase together with necessary initiators are added directly to the reaction mixture in which the elastomeric core is formed, and polymerization proceeds until the supply of monomers is substantially exhausted. Monomers such as an alkyl ester of an unsaturated carboxylic acid, for example a $C_1$–$C_8$ alkyl acrylate like methyl acrylate, hydroxy ethyl acrylate or hexyl acrylate, or a $C_1$–$C_8$ alkyl methacrylate such as methyl methacrylate or hexyl methacrylate, or mixtures of any of the foregoing, are some of the monomers which can be used for this purpose. Either thermal or redox initiator systems can be used. Because of the presence of the graft linking agents on the surface of the elastomeric core, a portion of the chains which make up the rigid thermoplastic phase are chemically bonded to the elastomeric core. It is preferred that there be at least about 20% bonding of the rigid thermoplastic phase to the elastomeric core.

A preferred acrylate rubber is made up of more than about 40% to about 95% by weight of an elastomeric core and about 60% to about 5% of a rigid thermoplastic phase. The elastomeric core can be polymerized from about 75% to about 99.8% by weight $C_1$–$C_6$ acrylate, preferably n-butyl acrylate. The rigid thermoplastic phase can be polymerized from at least 50% by weight of $C_1$–$C_8$ alkyl methacrylate, preferably methyl methacrylate. A product having substantially such content is available commercially from Rohm and Haas Company as Paraloid TM 3330 composite interpolymer. Acrylate rubbers and methods for making same, as described above, are discussed in greater detail in Owens, U.S. Pat. No. 3,808,180 and Witman, U.S. Pat. No. 4,299,928, each being incorporated herein.

(e) Talc Filler. A filler such as talc is used in this invention, "talc" refering to hydrous magnesium silicate, $Mg_3SiO_{10}\cdot(OH)_2$ or $Mg_3Si_4O_{10}\cdot(OH)_2$. Pyrophyllite, the aluminum analog of talc [$Al_2SiO_{14}\cdot(OH)_2$ or $Al_2Si_4O_{10}\cdot(OH)_2$], can also b used as a talc filler in the compositions of this invention. Talc particles typically have a size in the range of 200 mesh or greater, and it is preferred that a major portion, for example more than 75% by weight, have a mesh greater than 325.

A particularly preferred form of talc is that which is adheringly associated with a binder or carrier. An example of this is a filler where talc is present in the form of a talc concentrate comprising talc in a polyolefin carrier. The talc filler is usually at least 50% by weight, and preferably at least 85% by weight, of the concentrate when talc is used as a filler in the form of a talc concentrate comprising talc in a polyolefin carrier or binder. Polyolefins such as polyethylene, polypropylene and the like can be used as the carrier or binder to adheringly associate with the talc.

Numerous other additives are available for use in the compositions of this invention for a variety of purposes including protection against thermal, oxidative and ultra-violet degradation. Representative of thermal and oxidative stabilizers which can advantageously be utilized herein are hindered phenols, hydroquinones, phosphites, including substituted members of those groups and/or mixtures of more than one thereof. A preferred phenolic anti-oxidant is Irganox™ 1076 anti-oxidant, which is available from Ciba-Geigy Corp. and is discussed in greater detail in U.S. Pat. Nos. 3,285,855 and 3,330,859, each being incorporated herein. Ultra-violet stabilizers such as various substituted resorcinols, salicylates, benzotriazoles, benzophines and hindered phenols can also be usefully included herein, as can be lubricants; colorants; pigments; ignition resistance additives; mold release agents; and reinforcing agents such as fiberglass. Additives and stabilizers such as the foregoing, and others which have not been specifically mentioned, are known in the art. With the exception of fillers, the decision as to which of these additives, if any, to use is not critical to the invention. However, such additives other than fillers, if used, will typically not exceed 50% by weight of the total composition, and preferably will not exceed 30% by weight thereof.

Illustrative Embodiments. To illustrate the practice of this invention, examples of several preferred embodiments are set forth below. It is not intended, however, that these examples (Examples 1 and 2) should in any manner restrict the scope of this invention. Some of the particularly desirable features of this invention may be seen by contrasting the characteristics of Examples 1 and 2 with those of a controlled formulation (Control A) which does not possess the features of, and is not therefore an embodiment of, this invention.

The respective components of Control A and Examples 1 and 2 are dry blended by tumble blending for seven minutes. The components of each control and example are then extruded in a 30 mm co-rotating twin screw Werner-Phfleiderer vented extruder, however the components are not dried prior to the tumble blending or the extrusion. Removal of water, which could be detrimental to polyester, is achieved to some extent through the vent on the extruder, which allows the escape of any water vapor driven off by the heat of the melt process. The set temperatures on the extruder (°C.), from front to rear, are 270, 270, 270, 270 and 200, and the screw speed is 250 rpm.

The extruded pellets are dried prior to injection molding at about 105° C. for about six hours in a hot air circulating oven, and are then molded into test specimens using a 75-ton Arburg molding machine. The injection molding conditions are as follows: set temperatures (°C.) rear 270, middle 270, front 270, nozzle 270 and mold 85; and screw speed 300 rpm.

The amounts of the various components which are blended or admixed to form, respectively, Control A and Examples 1 and 2 are shown in Table I, wherein amount, or content, is stated in parts by weight of the total composition. The following components are indentified in Table I as follows:

"(1) Polycarbonate" is Calibre® 300-10 polycarbonate resin, a 10 melt flow value polycarbonate resin available from The Dow Chemical Company;

"(2) Polyester" is poly(ethylene terephthalate) available from Goodyear Tire & Rubber Company as Traytuf™ 1006C polyester resin:

"(3) ECO" is a 10 melt index (as determined by ASTM D 1238, condition E) ethylene/carbon monoxide copolymer of which the portion derived from carbon monoxide is 10% by weight of the copolymer:

"(4) MBS" is Metablend™ methyl methacrylate/-styrene/butadiene rubber available from M&T Chemical Co.:

"(5) Talc" is MP25-38 talc from Pfizer Pharmaceutical Co.;

"(6) Talc Concentrate" is 85% talc filler in a polyolefin carrier available from Pro-Alloy, Inc.

The results of several tests performed on Control A and Examples 1 and 2 are also shown in Table I.

The coeffecient of linear thermal expansion ("CLTE") is measured from 70° F. to 120° F. at a heating rate of 2° C./minute in accordance with ASTM D 696-79.

The Gardner dart drop impact test is performed at room temperature by dropping a 16 pound (7.26 km) weight which carries a ½" (12.7 mm) dart onto a circular test sample which is 2½" (63.5 mm) in diameter and 1/8" (3.175 mm) thick. The weighted dart falls freely on a slotted track and impacts the sample, which is secured in position in the path of descent on an aluminum cast base with a 0.640 inch (16.26 mm) hole to accept the dart after it impacts the sample. The instrument is a Pacific Scientific model no. IG-1120. The sample fails if it shows a crack or perforation on the side on which impact did not occur. The results are either pass (no break or perforation by the dart at the point of impact) or fail (material exhibits crack or perforation) when the dart has developed a particular amount of energy by falling from the necessary height on the track, as indicated thereon, to develop such energy. The reading recorded in Table 1 is the greatest amount of energy a sample could accept without failing.

Impact resistance is measured by the Izod test according to ASTM Designation D 256-84 (Method A). The notch is 10 mils (0.254 mm) in radius.

Percent elongation at break is measured in accordance with ASTM Designation D 638-84 with respect to samples which have been placed under 0.7% strain while submerged in a bath of 60 vol % isooctane and 40 vol % toluene for 5 minutes and then have been allowed to dry for 24 hours before testing testing, and with respect to samples which have not been strained or placed in a solvent bath.

Deflection temperature under load ("DTUL") is measured in accordance with ASTM Designation D 648-82 at 264 psi.

TABLE I

Content and Test Results for Control A and Examples 1-2

| | Control A | Example 1 | Example 2 |
|---|---|---|---|
| (1) Polycarbonate | 75 | 68.25 | 67.05 |
| (2) Polyester | 10 | 9.1 | 8.94 |
| (3) ECO | 7 | 6.37 | 6.258 |
| (4) MBS | 8 | 7.28 | 7.152 |
| (5) Talc | — | 9 | — |
| (6) Talc Concentrate | — | — | 10.6 |

TABLE I-continued

Content and Test Results for Control A and Examples 1-2

| | Control A | Example 1 | Example 2 |
|---|---|---|---|
| CLTE, in/in-°F. | 4.3 | 3.6 | 3.8 |
| Gardner Dart Drop, in-lb | 448 | 352 | 368 |
| Izod, ft-lb | 11.2 | 2.0 | 8.5 |
| percent elongation at break, no solvent soak | 112 | 20 | 34 |
| percent elongation at break, after solvent soak | 101 | 4 | 33 |
| DTUL, °F. | 235 | 234 | 234 |

The test data in Table I show that, in a composition containing a polycarbonate, a polyester, an olefin/carbon monoxide copolymer and a grafted core-shell elastomer, a filler such as talc will increase the dimensional stability by reducing the coefficient of linear thermal expansion ("CLTE"). However, in that process, readings as to certain other properties are not maintained at the level of Control A, the composition without a filler. This may be seen in the test readings obtained for Example 1. However, it is also apparent that a talc concentrate in a polyolefin carrier achieves a favorable decrease in CLTE but does so while maintaining more of the desirable levels as to other properties of the composition. For example, the Izod reading and percent elongation reading after the solvent soak are noticeably higher for Example 2 than Example 1. The compositions containing a talc filler in a carrier as a concentrate possess a particularly good balance of solvent resistance, impact strength and dimensional stability, a result which is not achieved if the talc and the material serving as the carrier are added to the composition separately.

It is within the skill in the art to practice this invention in numerous modifications and variations in light of the above teachings. It is, therefore, to be understood that the various embodiments of this invention described herein may be altered without departing from the spirit and scope of this invention as defined by the appended claims.

What is claimed is:

1. A composition of matter comprising, in admixture, (a) about 10 parts to about 93 parts by weight aromatic polycarbonate, (b) about 5 parts to about 90 parts by weight polyester, (c) about 1 part to about 15 parts by weight olefin/carbon monoxide copolymer, (d) about 1 part to about 20 parts by weight grafted core-shell elastomer, and (e) about 1 part to about 40 parts by weight talc concentrate in the form of a talc filler in a polyolefin carrier, wherein said talc filler is at least fifty percent by weight of said concentrate.

2. The composition of claim 1 wherein the content thereof, by weight of the total composition, is (a) about 38 parts to about 87 parts aromatic polycarbonate, (b) about 10 parts to about 60 parts polyester, (c) about 1 part to about 10 parts olefin/carbon monoxide copolymer, (d) about 1 part to about 15 parts grafted core-shell elastomer, and (e) about 1 part to about 30 parts talc filler.

3. The composition of claim 1 wherein the olefin/carbon monoxide copolymer is an ethylene/carbon monoxide copolymer.

4. The composition of claim 1 wherein the grafted core-shell elastomer comprises a rubber core to which is grafted one or more vinyl monomers.

5. The composition of claim 4 wherein the rubber core comprises a polymer at least 45% of which by weight is polymerized from butadiene.

6. The composition of claim 5 wherein a plurality of vinyl monomers are grafted to the rubber core.

7. The composition of claim 6 wherein the grafting vinyl monomers include a vinyl aromatic monomer and an alkyl ester of an unsaturated carboxylic acid.

8. The composition of claim 4 wherein the rubber core comprises a polymer at least 50% of which by weight is polymerized from one or more alkyl acrylates.

9. The composition of claim 8 wherein one or more vinyl monomers are grafted to the rubber core.

10. The composition of claim 9 wherein at least an alkyl ester of an unsaturated carboxylic acid is grafted to the rubber core.

11. The composition of claim 1 wherein the polyolefin carrier is a polyethylene or a polypropylene.

12. The composition of claim 1 wherein (a) the polycarbonate is a Bisphenol-a polycarbonate;

(b) the polyester is a poly(alkylene phenylenedicarboxylate);

(c) the olefin/carbon monoxide copolymer is an ethylene/carbon monoxide copolymer;

(d) the grafted core-shell elastomer is selected from the group consisting of (i) an elastomer comprising a core, at least 45% of which by weight is polymerized from butadiene, to which are grafted at least a vinyl aromatic monomer and an alkyl ester of an unsaturated carboxylic acid, (ii) an elastomer comprising a core, at least 50% of which by weight is polymerized from one or more alkyl acrylates, to which is grafted at least an alkyl ester of an unsaturated carboxylic acid, and (iii) mixtures thereof; and (e) the polyolefin carrier is a polyethylene or a polypropylene.

13. The composition of claim 1 in the form of a molded article.

14. The composition of claim 12 in the form of a molded article.

15. A method of molding an article from a polyblend comprising (a) forming a polyblend by admixing a talc concentrate in the form of a talc filler in a polyolefin carrier wherein, wherein said talc filler is at least fifty percent by weight of said concentrate, with a composition comprising about 10 parts to about 93 parts by weight polycarbonate, about 5 parts to about 90 parts by weight polyester, about 1 part to about 15 parts by weight olefin/carbon monoxide copolymer and about 1 part to about 20 parts by weight grafted core-shell elastomer; and (b) molding an article from said polyblend.

* * * * *